W. WACHS.
BAKER AND ROASTER.
No. 171,200. Patented Dec. 14, 1875.
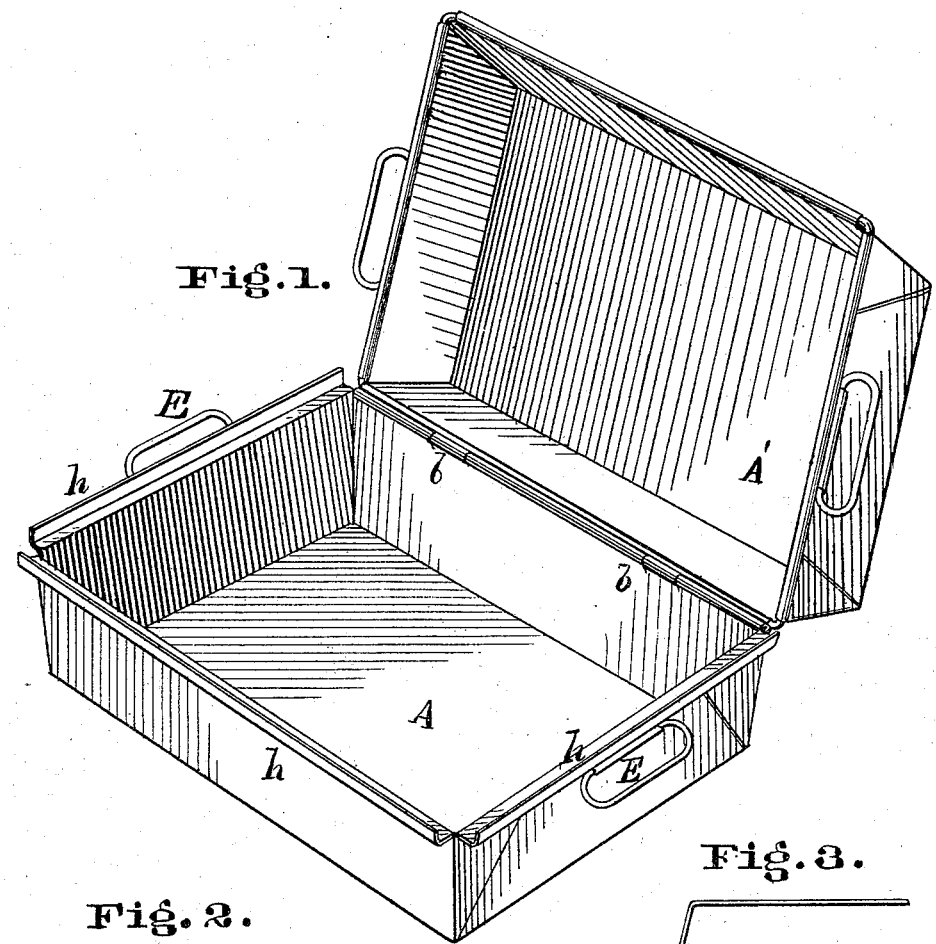
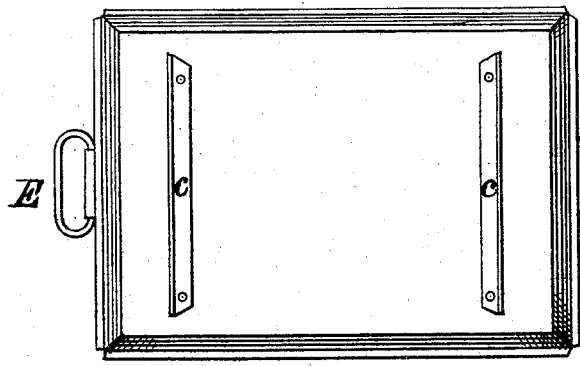
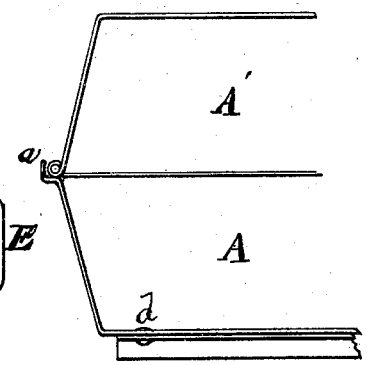
Attest.
Inventor.

UNITED STATES PATENT OFFICE.

WILLIAM WACHS, OF COVINGTON, KENTUCKY.

IMPROVEMENT IN BAKERS AND ROASTERS.

Specification forming part of Letters Patent No. 171,200, dated December 14, 1875; application filed June 12, 1874.

*To all whom it may concern:*

Be it known that I, WILLIAM WACHS, of Covington, Kenton county, State of Kentucky, have invented certain Improvements in Bakers and Roasters, of which the following is a specification:

My invention relates to an improved pan for baking and roasting. It is intended to be used for meats and vegetables, and may be used equally well for bread. It consists, first, in forming a covered bake-pan, with parts hinged together; and, second, in the peculiar construction of the overlapping flanges of the lower part of the pan, these flanges being formed by bending the edges to an L-shaped form, so that they will incase the edge of the upper part when the pan is inclosed in baking, and thus prevent the escape of the gases generated in baking.

In the drawings, Figure 1 is an elevation of my baker and roaster, showing it, with the upper half raised. Fig. 2 is a front view of the bottom of the roaster, showing the ribs for elevating it. Fig. 3 is a sectional view of my baker and roaster, showing it closed.

A A' are two sheet-iron baking-pans of any desired size. The bottom one, A, has three of its edges, h h h, bent to an L shape, (as seen at a, Fig. 3,) while the other edge (the back) is curved over a wire, as usual. The upper pan A' has all its edges curved over wires in the customary manner, while at the back two hinges, b b, are attached, connected with the wire in the back of A, as seen in Fig. 1. When the pan is closed the edge of A' fits into the L-shaped edge of A closely, so as to retain all the evolved gases as much as practicable. The under pan has on the bottom the ribs c c formed by riveting an L-shaped piece of sheet metal to the bottom of the pan, as seen at d, Fig. 3.

These ribs are of such a height that when the pan is opened the upper part A' will rest squarely and evenly on the bottom of the oven, the length of the hinge beyond the edge of the pan being about equal to the height of the ribs. E E are handles made in the usual manner.

The peculiar construction of my baker and roaster enables it to be used for baking bread or biscuits as a double pan, and then closed for cooking meat or vegetables, or roasting coffee, &c.

When closed it retains all the heat and all the gases evolved in baking, keeps in the flavors of the meat, presents an equal heat to each side of it at the same time, and by means of the ribs prevents the bottom from being burned.

This pan may be used on the top of the stove with great success.

I am aware that a covered bake-pan has been made, in which the lower part has a solid cast-iron flange secured to the outer edge, into which fits a cover. This, however, is inconvenient in use, having no means for readily observing the process of baking, and the heavy cast-iron flange is objectionable, as expensive, clumsy, and possessing no elasticity, enabling it to conform closely to the edge of the upper pan.

These objections are overcome by the manner in which I construct my pan. Moreover, mine is capable of use as a double-open pan for baking bread, if desired.

I claim—

1. In a covered bake-pan, the flanges h h h, formed of the same piece of sheet metal as the lower part of the pan by bending the edges outwardly, so as to receive and incase the upper part or cover of the pan, substantially as and for the purposes described.

2. A covered sheet-metal bake-pan, the two parts of which are hinged together, and so adjusted relatively to each that they may be used either as a single covered or as a double open pan, substantially as and for the purposes described.

WM. WACHS.

Witnesses:
  JOHN E. HATCH,
  JEREMIAH F. TWOHIG.